Dec. 1, 1959 W. D. HETZEL ET AL 2,915,000
POP-UP COOKER
Filed Jan. 28, 1954 3 Sheets-Sheet 2

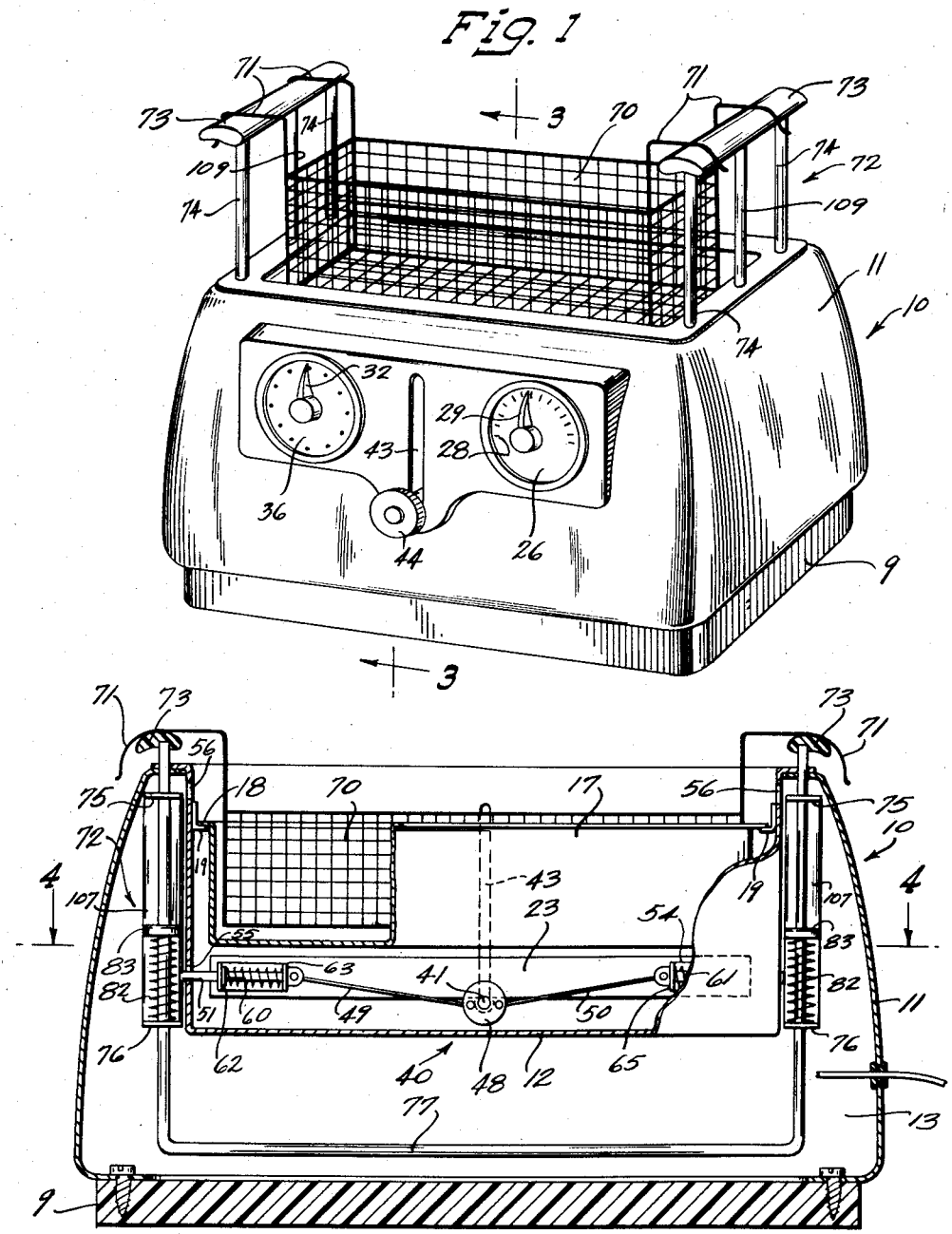

INVENTORS
Wayne D. Hetzel &
Jesse T. Simons
BY April M. Hajewski
Attorney

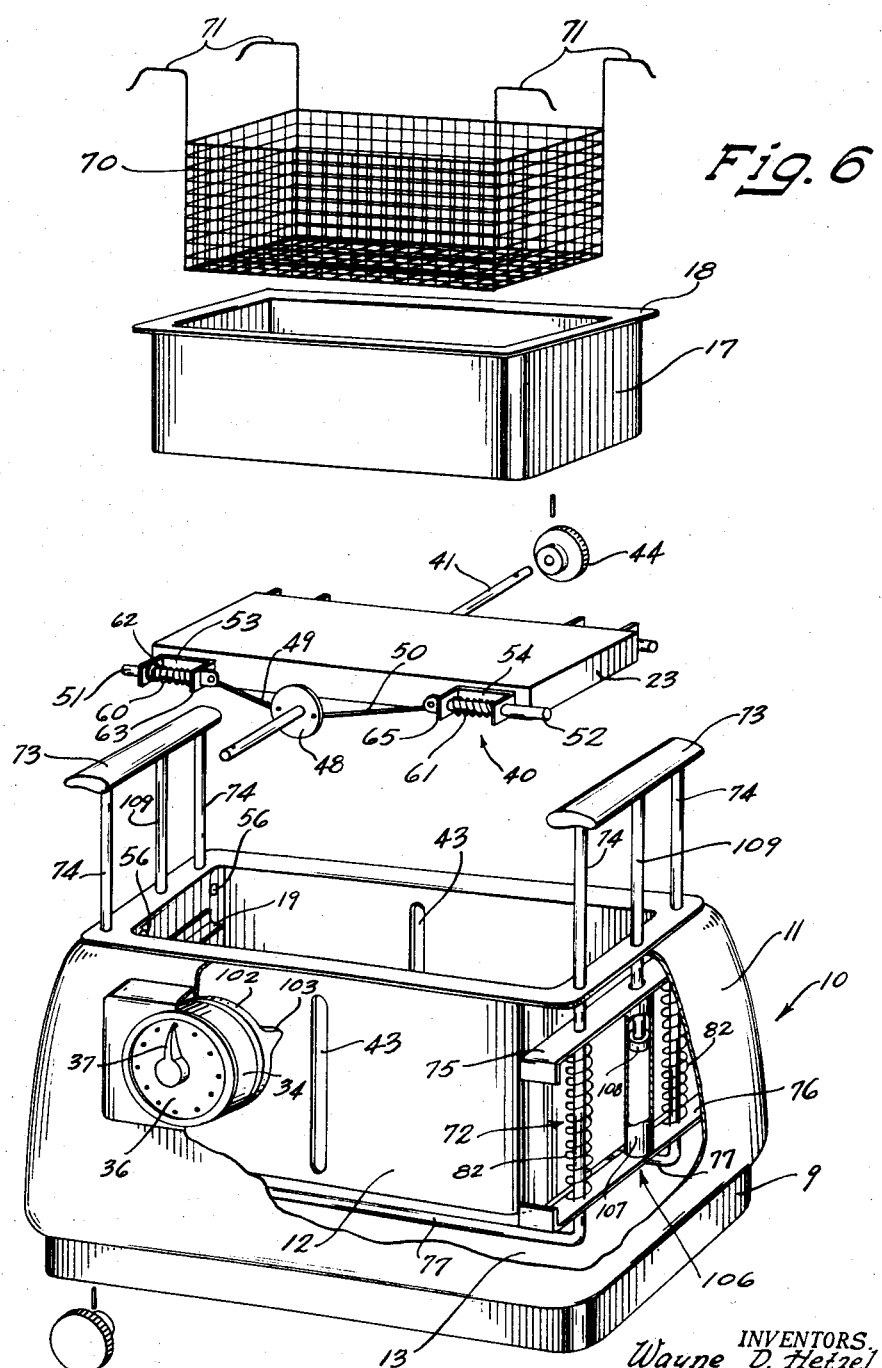

United States Patent Office 2,915,000
Patented Dec. 1, 1959

2,915,000

POP-UP COOKER

Wayne D. Hetzel, Hales Corners, and Jesse T. Simons, Milwaukee, Wis.; Inez Simons sole heir of said Jesse T. Simons, deceased Application January 28, 1954, Serial No. 406,764

2 Claims. (Cl. 99—327)

This invention relates generally to a pop-up cooker, and more particularly to an improved pop-up cooker especially adapted to perform a variety of cooking operations.

A multitude of automatic, electrically operated cooking appliances are available, but invariably the utility of the individual appliances is limited to a particular cooking operation. They do not possess the versatility which would render them adaptable for several applications. Thus, a deep fat fryer may be utilized for that single purpose and no other. Automatic egg cookers are available, but they have no other utility. Similarly, electric hot plates presently available serve as such and nothing more. It is therefore necessary to procure a separate appliance for each cooking function it is desired to perform, requiring a substantial expenditure and considerable storage space.

It is therefore a general object of the present invention to provide an automatic cooker adaptable for performing several distinct cooking operations.

Another object of the present invention is to provide an improved pop-up cooker which will also serve as a simple hot plate for furnishing heat to a cooking utensil.

Another object of the invention is to provide an improved pop-up cooker operable to automatically remove the food from the cooking medium after a preselected period of time.

Another object is to provide an improved pop-up cooker having a removable receptacle for containing the grease or liquid which is serving as the cooking medium.

A further object is to provide a pop-up cooker operable to automatically control the temperature of the cooking medium, and remove the food from the cooking medium after the expiration of a predetermined period of time.

A further object is to provide a pop-up cooker with a movable heating element for adjusting its position within the unit.

A still further object is to provide an improved pop-up cooker of simple and inexpensive but sturdy construction, and efficient in operation.

According to this invention the improved pop-up cooker includes a housing having a removable receptacle for containing shortening, grease, water or other cooking medium. The receptacle is located directly above a heating element which serves to heat the contents of the receptacle, the temperature of the heating element being selectively regulated by an adjustable thermostat. A wire mesh basket is supported by a movable carrier slidable in the housing to a depressed position and a raised position, being spring urged to its raised position and held in its depressed position by a latching mechanism against the force of the spring. In its depressed position, the carrier suspends the basket within the receptacle so that any food placed in the basket will be immersed in the cooking medium contained in the receptacle. Releasing the latching mechanism frees the carrier to permit the spring to operate and move it into its raised position, the basket moving with it, out of the receptacle, to remove the food from the cooking medium. The latching mechanism is connected to be released by a timer which operates to release the latching mechanism after the expiration of a preselected period of time so that the cooking period may be predetermined to conform to the particular cooking operation. In addition, the heating element is slidably mounted within the housing, having a lower position wherein it serves to heat the contents of the receptacle, and a raised position in which it protrudes slightly above the top surface of the housing to receive cooking utensils placed upon it, rendering it serviceable in the usual manner of a hot plate.

The foregoing and other objects of the invention, which will become apparent from the following detailed description setting forth an illustrative embodiment, may be achieved by the particular apparatus depicted in and described in connection with the accompanying drawings, in which:

Figure 1 is a perspective view of a pop-up cooker embodying the novel features of the present invention;

Figure 2 is a view of the pop-up cooker illustrated in Figure 1, substantially in front elevation with a portion of the housing removed to reveal the interior mechanism;

Figure 6 is an exploded perspective view of the cooker illustrated in Figure 1, depicting the several parts in the order of their assembly.

Figure 3:
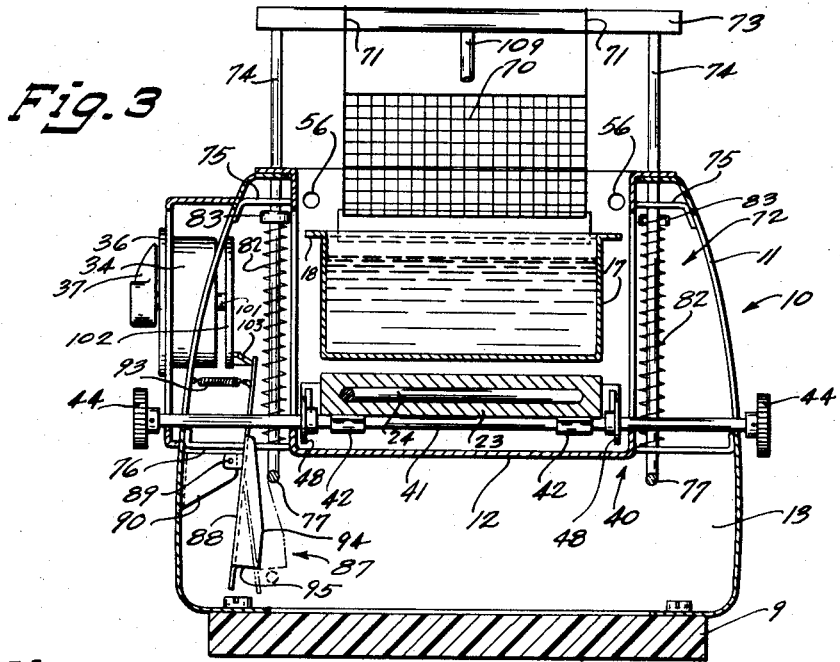
Figure 3 is a view partly in side elevation and partly in vertical section taken along the plane represented by the line 3—3 in Figure 1.

Referring now more particularly to the drawings where there is shown a pop-up cooker embodying the novel features of the present invention, comprising a base 9 supporting a housing generally indicated by the reference numeral 10, and including an exterior wall 11 having an interior wall 12 within it in spaced relationship to form a dead air space 13 between them to serve as an insulating medium. In addition, a portion of the operating mechanism is contained within the air space 13 between the walls 11 and 12. The interior wall 12 forms a compartment within the housing 10 for receiving a removable receptacle 17 which contains the cooking medium.

The receptacle 17 is provided with an outwardly extending flange 18 about its opening adapted to rest upon a pair of angles 19 secured to the interior wall 12 with one of their legs extending interiorly to serve as a ledge for supporting the receptacle 17. With this arrangement, the receptacle 17 may be readily removed simply by lifting it out of the compartment formed by the interior wall 12. Several of such receptacles may then be utilized, with each reserved to contain one of the cooking mediums.

Thus, for example, one of the receptacles 17 may be filled with fat for deep fat frying. When it is desired to perform a different cooking operation, such as boiling eggs, the receptacle containing the fat may be readily replaced by another receptacle filled with water. Similarly, other cooking operations can be better performed with shortening in lieu of fat, and for that purpose, a receptacle containing shortening may be made available. Furthermore, when the cooker is not in use, it may be stored in an appliance storage facility, while the receptacle containing the cooking medium is removed and placed in a proper food storage facility, such as a refrigerator for example, or other space in which the conditions are specifically maintained for the storage of food. The removability of the receptacle 17 also serves to facilitate its cleaning.

Figure 4:
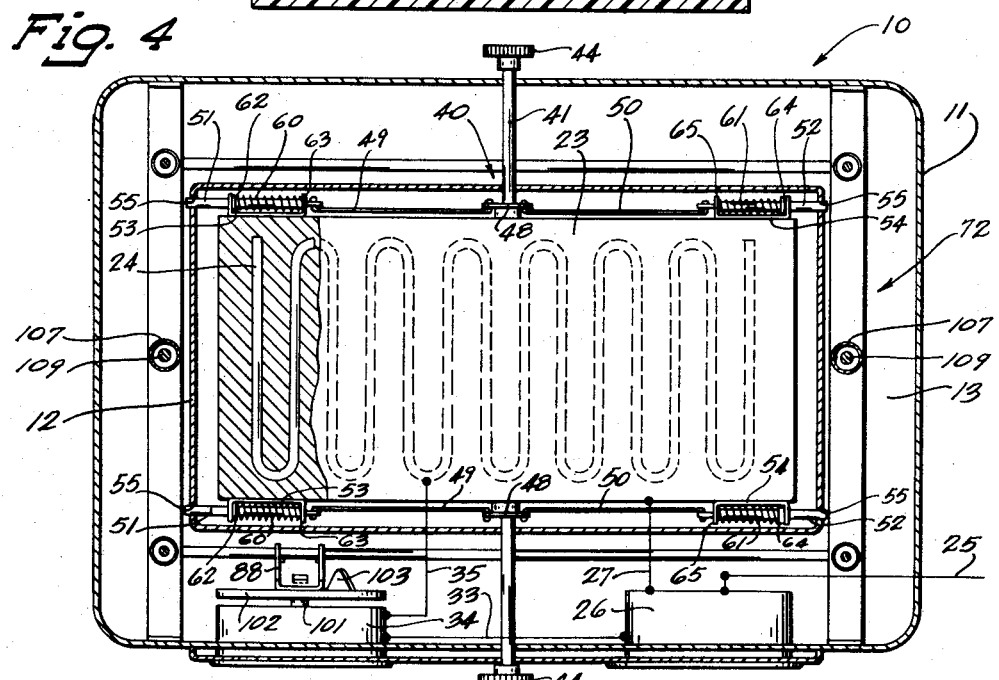
Figure 4 is a plan view partly in horizontal section taken along the plane represented by the line 4—4 in Figure 2, with the electrical wiring circuit being shown diagrammatically.

The contents of the receptacle 17 are heated by a hot plate 23 formed by embedding a suitable heating element 24 in a plate formed of aluminum or other efficient heat conducting material. As best seen in Figure 4, two controls are provided for selectively regulating the operation of the hot plate 23. The electrical circuit connecting these controls to the hot plate 23 is illustrated diagrammatically in Figure 4 for the purpose of clarity, and comprises a power cord 25 adapted to transmit electrical energy from the usual convenience outlet to a standard thermostatic switch 26. A thermocouple (not shown), is secured to the hot plate 23 and is connected to the thermostatic switch 26 by a conductor 27 to control its operation in response to the temperature of the hot plate 23.

As depicted in Figure 1, the thermostatic switch 26 includes an exposed graduated dial 28 with indicia indicating degrees of temperature, and a rotatable pointer 29 cooperating with the dial 28 to indicate a particular temperature setting at which the hot plate 23 will operate. The desired temperature may be set on the dial 28 and when the hot plate 23 is heated to the selected temperature, as indicated by the thermocouple, the switch 26 will open to break the electrical circuit to deenergize the heating element 24. The switch 26 will then operate in response to the signal of the thermocouple to maintain this preselected temperature.

The electrical circuit for transmitting energy to the heating element 24 continues from the thermostatic switch 26 through a conductor 33 to a timer switch 34, and thence through a conductor 35 to the heating element 24. The timer switch 34 is a commercially available type arranged to open upon the expiration of a preselected period of time. As illustrated in Figures 1 and 6, the timer switch 34 includes a dial 36 graduated in units of time and arranged to cooperate with a rotatable pointer 32 to indicate a period of time after which the timer switch 34 will open to break the circuit to the heating element 24 and cause its deenergization. Thus, the desired period of time is set by rotating the pointer 32 to the proper indicia on the dial 36 and the timer switch 34 will remain closed for such preselected period.

It is obvious, therefore, that the flow of electrical energy to the heating element 24 is regulated by the thermostatic switch 26 in response to the temperature of the hot plate 23, and by the timer switch 34 for a preselected period of time. Since the current flow is through both of these switches, both of them must be closed to enable the current to flow to the heating element 24, as the opening of either one of them will interrupt the flow and deenergize the heating element. Thus, they cooperate to maintain the hot plate 23 at a preselected temperature for a preselected period of time.

The hot plate 23 is arranged to be locked in two positions, a lower position and a raised position. It is illustrated in the drawings in its lower position, disposed directly beneath the receptacle 17 for heating its contents to the desired temperature. Upon removal of the receptacle 17 from within the housing 10, the hot plate 23 may be moved to its raised position, where its upper surface extends above the top of the housing 10 to permit the usual kitchen utensils to rest upon the hot plate 23 so that it may function as an ordinary hot plate which is usually furnished as a separate appliance.

A locking mechanism generally denoted by the reference numeral 40 is provided for locking the hot plate 23 in either of its two positions. The locking mechanism 40 comprises a shaft 41 journalled in two bearings 42 (Figure 3) fixed to the underside of the hot plate 23. The length of the shaft 41 exceeds the width of the housing 10, so that it extends exteriorly thereof on both sides through slots 43, best shown in Figure 6. A knurled knob 44 is pinned to each of the two extending ends of the shaft 41 to facilitate its manipulation.

A pair of circular discs 48 are fixed to the shaft 41 to rotate with it, one being disposed on each side of the hot plate 23 and adjacent to it. Diametrically opposite holes are formed in the discs 48 for receiving the ends of a pair of links 49 and 50, the ends being bent 90° to the links so that the latter extend transversely of the shaft 41 and in opposite directions. The ends of the links 49 and 50 are free to pivot within the holes in the discs 48, and are retained therein by peening the portion extending outwardly of the disc 48 or by any other suitable manner.

The ends of the links 49 and 50 opposite the disc 48 are similarly secured to a pair of plungers 51 and 52 slidably supported for axial movement in brackets 53 and 54 respectively. The two plungers 51 and the two plungers 52 are all disposed to enter a set of four lower holes 55 formed in the interior wall 12 for holding the hot plate 23 in its lower position to supply heat to the contents of the receptacle 17. Similarly, a set of four upper holes 56 are provided in the interior wall 12 for receiving the plungers 51 and 52 to support the hot plate 23 in its upper position.

The plungers 51 and 52 are spring urged into the holes 55 or 56 by compression springs 60 and 61 respectively coiled about them. One end of the spring 60 bears against a washer 62 secured to the plunger 51 while its other end bears against an extending leg 63 of the bracket 53. In the same manner, the spring 61 on the opposite side is coiled about the plunger 52 between a washer 64 fixed to the plunger 52 and an extending leg 65 of the bracket 54. The identical construction, of course, exists on both sides of the hot plate 23, and the corresponding parts bear the identical reference numerals.

The springs 60 and 61 bear against the washers 62 and 64 respectively to urge the plungers 51 and 52 in opposite directions into the holes 55 or 56 to support the hot plate 23 in the desired position. To withdraw the plungers 51 and 52 from the holes 55 or 56 preparatory to moving the hot plate 23, it is only necessary to grasp the knobs 44 and revolve them in either direction to effect a corresponding rotation of the shaft 41. The discs 48 turn with the shaft 41 to effect a movement of the links 49 and 50 in opposite directions toward the shaft 41 by reason of their connection therewith at diametrically opposite points.

Such movement of the links 49 and 50 causes a withdrawal of the plungers 51 and 52 from the holes 55 or 56, the washers 62 and 64 moving with the plungers 51 and 52 respectively to compress the springs 60 and 61 against the extending legs 63 and 65 respectively. The knobs 44 may then be lowered or raised to move the hot plate 23 correspondingly, the shaft 41 moving laterally within the slots 43. When the knobs 44 are released, the springs 60 and 61 again urge the plungers 51 and 52 outwardly into engagement with the holes 55 or 56 when they come into alignment with them. Thus, the hot plate 23 may be conveniently raised and lowered within the housing 10 and it will be securely retained in the desired position.

The appliance is also constructed to automatically remove the food from the contents of the receptacle 17 upon the expiration of a preselected period of time. To this end, the food is placed in a wire mesh basket 70 having upwardly extending hooks 71 which engage a movable carrier generally denoted in the drawings by the reference numeral 72. The basket 71 is supported by the carrier 72 through the hooks 71 and may be removed simply by lifting it upwardly. The carrier 72 comprises a pair of support plates 73, one of which is located at each end of the housing 10 for receiving the hooks 71 to support the basket 70.

Each of the support plates 73 is secured to the upper ends of a pair of slide bars 74 which extend downwardly therefrom through suitable holes formed in the housing 10 into the air space 13. A pair of guide plates 75 and 76 (Figure 6) are secured to the housing 10 within the air space 13 in spaced relationship, and are provided with holes for receiving the slide bars 74 to guide them in their path of movement. One set of guide plates 75 and 76 is mounted at one end of the housing 10 to guide one pair of the slide bars 74 as shown in Figure 6, and another set of such guide plates 75 and 76 is mounted in the opposite end of the housing 10 to guide the other pair of slide bars 74.

One of each pair of the slide bars 74 are connected together by tie rods 77 extending across the length of the housing 10 underneath the bottom of the interior wall 12 as best seen in Figures 2 and 6, to form a unitary structure comprising the two support plates 73, the four slide bars 74 and the two tie bars 77, which move vertically together and form the carrier 72 for moving the basket 70 into and out of the receptacle 17.

The carrier 72 is yieldably urged upwardly to its raised position, wherein it supports the basket 70 out of the receptacle 17, by four coil springs 82. One of the coil springs 82 is coiled about each of the slide bars 74 between the lower guide plate 76 and a cap 83 fixed to each of the slide bars 74 to move with it. Thus, the springs 82 bear at one end against the fixed guide plates 76, and at their other end against the caps 83. Since the caps 83 are fixed to the slide bars 74 the spring force is applied against them to urge the slide bars 74, and therefore the entire carrier 72, upwardly to its raised position, to lift the basket 70 out of the receptacle 17.

To depress the carrier 72 to its lower position, as shown in Figure 2, it is only necessary to apply a pressure upon the support plates 73 to move the carrier 72 downwardly against the oppositely acting force of the springs 82, until the basket 70 is disposed within the receptacle 17. The carrier 72 will then be held in this lower position by a releasable latching mechanism generally denoted by the reference numeral 87.

Figure 5:
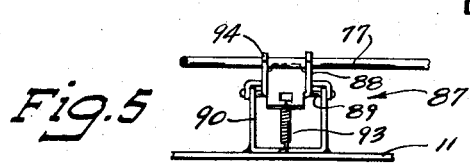
Figure 5 is a fragmentary detail plan view of the latching mechanism for holding the basket in its depressed position.

As best seen in Figures 3 and 5, the latching mechanism 87 comprises a latch 88 pivotable about a pin 89 which is supported by a bracket 90 fixed to the interior surface of the wall 11. A spring 93 is secured at one end to the wall 11 of the housing 10, and at its other end to the latch 88 above the pin to yieldably urge the latch 88 in a counterclockwise direction about the pin 89, and thereby move a tapered surface 94 formed on the latch 88, in the path of movement of the tie rod 77.

Therefore, as the carrier 73 is forced downwardly, the tie rod 77 strikes the surface 94 of the latch 88, and as it continues its downward movement, it pivots the latch 88 in a clockwise direction against the force of the spring 93 to move the surface 94 to the left as viewed in Figure 3, out of its path of movement. When the tie rod 77 passes the lowermost end of the surface 94, it releases the latch 88 to permit the spring 93 to again take over and pivot the latch 88 in a counterclockwise direction, to move an abutment surface 95 directly above the tie rod 77 and prevent its upward movement, as shown in broken lines in Figure 3. The carrier 72 may then be released, and the springs 82 will be urging it toward its raised position, but will only be forcing the tie rod 77 against the abutment surface 95 which prevents an upward movement of the carrier 72.

To release the carrier 72, it is only necessary to pivot the latch 88 in a clockwise direction to move the abutment surface 95 to the left as viewed in Figure 3, out of engagement with the tie rod 77, as shown in solid lines in Figure 3. This is done automatically by the timer 34 at the same time that its switch breaks the circuit to the heating element 24, so that the heating element 24 is deenergized at the same time that the basket 70 is lifted out of the receptacle 17.

To this end, the timer 34 is provided with a rearwardly extending shaft 101 which is rotated by the timing mechanism. A circular plate 102 is attached to the shaft 101 in axial alignment therewith, and is provided with a rearwardly extending protrusion 103 which operates to actuate the latch 88, pivoting it in a clockwise direction to move the abutment surface 95 out of engagement with the tie rod 77, and release the carrier 72 for movement to its raised position.

Thus, in operation, the carrier 72 is moved to its lower position and held there by the abutment surface 95. The pointer 32 is rotated to set the timer mechanism for the desired period of time, and the shaft 101 and its associated circular plate 102 rotate with it a corresponding amount to move the protrusion 103 away from the latch 88. When the pointer 32 is released, the timing mechanism operates to rotate the circular plate 102 in the opposite direction until upon the expiration of the preselected period of time, the protrusion 103 strikes the latch 88 to pivot it in a clockwise direction about the pin 89 and thereby move the abutment surface 95 out of engagement with the tie rod 77 and permit the springs 82 to move the carrier 72 to its raised position, lifting the basket 70 with it, out of the receptacle 17.

To insure the upward movement of the carrier 72, the force exerted upon it by the springs 82 is relatively strong. Therefore, if the springs were allowed to operate without interference, the carrier 72 would raise too rapidly and disturb the contents of the basket 70. The upward movement of the carrier 72 is therefore retarded by a pair of dash pot mechanisms, one of which is shown in Figure 6 and is generally denoted by the reference numeral 106. Two identical dash pot mechanisms 106 are provided, one within each end of the end of the housing 10, only one of which is shown in Figure 6 and will be here described.

The dash pot mechanism 106 is a simple piston and cylinder mechanism comprising a cylinder 107 mounted between the two guide plates 75 and 76. A piston 108 is located within the cylinder 107, and is attached to a piston rod 109 which extends upward therefrom between the two slide bars 74 and is secured at its upper end to the support plate 73. Therefore, when the carrier 72 is moved downwardly, the piston 108 moves downwardly with it, within the cylinder 107, and the bottom of the cylinder 107 may be open so that there is no interference with the downward movement.

In like manner, when the carrier 72 moves upwardly, the piston 108 moves upwardly with it within the cylinder 107, forcing the air above it out of the cylinder through an exhaust port (not shown) which limits the rate of flow of air through it, so that the speed of the upward movement of the piston 108, and therefore the carrier 72 is limited, to effect a slow but positive movement of the carrier 72 to its raised position which will not disturb the contents of the basket 70. Since one of the dash pot mechanisms 106 is provided at each end of the carrier 72, the retarding effect is equally applied at each end to balance the mechanism.

From the foregoing detailed description of the structure and operation of the illustrative embodiment of the present invention, it will be apparent that a new and improved pop-up cooker has been provided which is versatile in operation, being especially adapted to perform a variety of cooking operations efficiently and automatically.

Although the illustrative embodiment of the present invention has been described in considerable detail for the purpose of making a full disclosure of a practical operative arrangement by means of which the invention may be practiced, it is to be understood that various novel features of the invention may be incorporated in other arrangements without departing from the spirit and scope of the invention as defined in the subjoined claims.

The principles of the invention having now been fully explained in connection with the foregoing description of embodying structure, we hereby claim as our invention:

1. In a cooking appliance, a housing, a compartment formed within said housing, said compartment being open at the top with its walls forming a closed air space with the walls of said housing, a removable receptacle adapted to be inserted into said compartment selectively and to contain a cooking medium, a heating element connected to a source of electric current for energization and supported within said compartment in position to beat the contents of said receptacle when the receptacle is in position in said compartment, a first pair of vertical slide bars slidably supported by said housing in spaced relationship at one end thereof for vertical movement and extending from a point in the dead air space beneath the bottom surface of said compartment to a point above the top surface of said housing, a second pair of vertical slide bars slidably supported by said housing in spaced relationship at the end of the housing opposite the end at which said first pair of slide bars is located, a support plate secured to each pair of said slide bars at their upper ends exteriorly of said housing to connect the two slide bars of each pair together, a pair of tie rods with each tie rod secured to the bottom end of one of the slide bars of each pair to connect them together, said tie rods being parallel to each other and extending horizontally in the closed air space beneath said compartment, a coil spring about each of said slide bars and connected to urge said slide bars and their associated support plates and tie rods upwardly to their upper limit of movement, a basket removably supported by said support plates for movement with them and adapted to be disposed within said receptacle when said support plates and their associated slide bars are in their lowermost position and to be withdrawn from said receptacle when said support plates are moved to their uppermost position, a latch having a tapered surface and an abutment surface beneath the tapered surface, said latch being pivotally supported by said housing in the closed air space in position so that the tapered surface and the abutment surface may be moved into and out of the vertical path of movement of one of said tie rods with the abutment surface being located above the tie rod when the latter is in its lowermost position so as to interfere with its upward movement when the abutment surface lies in the path of travel of said tie rod, a latch spring connected at one end to said housing and at its other end to said latch to yieldably urge said latch in its pivotal movement into position to locate the tapered surface and the abutment surface in the path of travel of said tie rod, a timer mechanism connected to break the electrical circuit to said heating element to deenergize said heating element after the expiration of a preselected period of time, a plate connected to be rotated by said timer mechanism in synchronism therewith, a protrusion secured to said plate to rotate with it in position to engage said latch and pivot it against the force of said latch spring to move the abutment surface out of the path of its associated tie rod at the same time that said timer breaks the electrical circuit to said heating element to release the tie rod and permit it and its associated slide bars and support plates to move upwardly to move said basket upwardly with it to withdraw said basket from said receptacle, whereby said heating element will be deenergized and said basket will be withdrawn from the cooking medium in said receptacle upon the expiration of a preselected period of time by the operation of said timing mechanism, and as said tie rod is moved downwardly with its associated slide bars and support plates to return said basket into said receptacle said tie rod will engage the tapered surface of said latch to pivot the latch against the force of said latch spring out of the path of movement of said tie rod, and as said tie rod passes the tapered surface and moves beneath the abutment surface it will release said latch to permit the spring to pivot said latch to move its associated abutment surface over said tie rod to retain said tie rod and its associated slide bars and support plates in their lowermost position against the force of said coil springs to locate said basket within said receptacle.

2. In a cooking appliance, a housing, a compartment formed within said housing, said compartment being open at the top with its walls forming a closed air space with the walls of said housing, a removable receptacle adapted to be inserted into said compartment selectively and to contain a cooking medium, a heating element connected to a source of electric power for energization and supported within said compartment in position to heat the contents of said receptacle when the receptacle is in position within said compartment, a first pair of vertical slide bars slidably supported by said housing in spaced relationship at one end thereof for vertical movement and extending from a point in the dead air space beneath the bottom surface of said compartment to a point above the top surface of said housing, a second pair of vertical slide bars slidably supported by said housing for axial movement in spaced relationship at the end of the housing opposite the end at which said first pair of slide bars is located, a support plate secured to each pair of said slide bars at their upper ends exteriorly of said housing to connect the two slide bars of each pair together, a pair of tie rods with each tie rod secured to the bottom end of one of the slide bars of each pair to connect them together, said tie rods being parallel to each other and extending horizontally in the closed air space beneath said compartment, a coil spring about each of said slide bars and connected to urge said slide bars and their associated support plates and tie rods upwardly to their upper limit of movement, a basket removably supported by said support plates for movement with them and adapted to be disposed within said receptacle when said support plates and their associated slide bars are in their lowermost position and to be withdrawn from said receptacle when said support plates are moved to their uppermost position, a latch supported by said housing in the dead air space and operable to engage one of said tie rods to retain said tie rods and their associated slide bars and support plates in their lowermost position against the force of said coil springs to locate said basket in said receptacle, and a timer mechanism connected to actuate said latch upon the expiration of a preselected period of time to release said tie bar and its associated structure and permit said coil springs to move said slide bars and support plates upwardly for moving said basket out of said receptacle, whereby said basket will be withdrawn from the cooking medium in said receptacle upon the expiration of a preselected period of time by the operation of said timing mechanism to terminate the cooking of food contained in said basket.

References Cited in the file of this patent

UNITED STATES PATENTS

| | | |
|---|---|---|
| 1,812,266 | Hummel et al. | June 30, 1931 |
| 1,876,072 | Moonan | Sept. 6, 1932 |
| 1,977,454 | Price | Oct. 16, 1934 |
| 2,121,444 | Osrow | June 21, 1938 |
| 2,147,319 | Smith | Feb. 14, 1939 |
| 2,177,166 | Bemis | Oct. 24, 1939 |
| 2,459,933 | Gomersall | Jan. 25, 1949 |
| 2,470,548 | Desjardins | May 17, 1949 |
| 2,546,464 | Martin | Mar. 27, 1951 |
| 2,571,216 | Davis | Oct. 16, 1951 |
| 2,630,062 | Litt | Mar. 3, 1953 |
| 2,639,657 | Lawson | May 26, 1953 |
| 2,664,495 | Wherli | Dec. 29, 1953 |
| 2,674,938 | Tagliaferri et al. | Apr. 13, 1954 |
| 2,716,697 | Grannan | Aug. 30, 1955 |